US009387718B2

(12) United States Patent
Mayrhofer et al.

(10) Patent No.: US 9,387,718 B2
(45) Date of Patent: Jul. 12, 2016

(54) SECURITY ELEMENT WITH COLOR-SWITCHING EFFECT, USE OF SAME AND METHOD FOR PRODUCING SAME

(71) Applicant: HUECK FOLIEN GES.M.B.H., Baumgartenberg (AT)

(72) Inventors: Marco Mayrhofer, Sierning (AT); Juergen Keplinger, Saxen (AT); Matthias Mueller, Bechtsried (AT)

(73) Assignee: Hueck Folien GES.M.B.H., Baumgartenberg (AT)

( * ) Notice: Subject to any disclaimer, the term of this patent is extended or adjusted under 35 U.S.C. 154(b) by 0 days.

(21) Appl. No.: 14/344,076

(22) PCT Filed: Oct. 3, 2012

(86) PCT No.: PCT/EP2012/004141

§ 371 (c)(1),
(2) Date: Mar. 11, 2014

(87) PCT Pub. No.: WO2013/050140

PCT Pub. Date: Apr. 11, 2013

(65) Prior Publication Data

US 2014/0342105 A1 Nov. 20, 2014

(30) Foreign Application Priority Data

Oct. 4, 2011 (EP) .................................... 11007998

(51) Int. Cl.
*B42D 15/00* (2006.01)
*B42D 25/29* (2014.01)
(Continued)

(52) U.S. Cl.
CPC ................ *B42D 15/00* (2013.01); *B42D 25/29* (2014.10); *B42D 25/351* (2014.10); *B42D 25/355* (2014.10); *B42D 25/364* (2014.10);
(Continued)

(58) Field of Classification Search
None
See application file for complete search history.

(56) References Cited

U.S. PATENT DOCUMENTS

2003/0207113 A1 11/2003 Coulter et al.
2005/0042449 A1 2/2005 Phillips et al.
(Continued)

FOREIGN PATENT DOCUMENTS

EP 0 319 157 6/1989
EP 0 435 129 7/1991
(Continued)

OTHER PUBLICATIONS

WO 2005038136 A1 Machine Translation via WIPO webiste.*
International Search Report (ISR) issued Dec. 3, 2012 in International (PCT) Application No. PCT/EP2012/004141.
English translation of Written Opinion and International Preliminary Report on Patentability issued Dec. 3, 2012 in International (PCT) Application No. PCT/EP2012/004141.

*Primary Examiner* — Mark Ruthkosky
*Assistant Examiner* — Laura C Powers
(74) *Attorney, Agent, or Firm* — Wenderoth, Lind & Ponack, L.L.P.

(57) ABSTRACT

A security element includes a coating of a material which has an optically variable effect, in particular a color-tilt effect, and cutouts which are identifiable in transmitted light. The security element comprises a carrier substrate and a partial layer having cutouts. The partial layer is made of an opaque coating having light-absorbing properties on the side that faces the coating made of the material having an optically variable effect and having a metallic coloration on the side that faces away from the coating made of the material having an optically variable effect. The partial opaque coating consists of a light-absorbing metallic layer.

19 Claims, 2 Drawing Sheets

(51) Int. Cl.

| | |
|---|---|
| ***B42D 25/351*** | (2014.01) |
| ***B42D 25/355*** | (2014.01) |
| ***B42D 25/373*** | (2014.01) |
| ***B42D 25/364*** | (2014.01) |
| ***B42D 25/45*** | (2014.01) |
| ***G06K 19/06*** | (2006.01) |
| ***B42D 25/369*** | (2014.01) |
| ***B42D 25/382*** | (2014.01) |
| ***B42D 25/387*** | (2014.01) |
| ***B42D 25/445*** | (2014.01) |

(52) U.S. Cl.
CPC ............ *B42D25/369* (2014.10); *B42D 25/373* (2014.10); *B42D 25/382* (2014.10); *B42D 25/387* (2014.10); *B42D 25/445* (2014.10); *B42D 25/45* (2014.10); *G06K 19/06187* (2013.01); *B42D 15/0026* (2013.01); *B42D 2033/08* (2013.01); *B42D 2033/10* (2013.01); *B42D 2035/24* (2013.01)

(56) References Cited

U.S. PATENT DOCUMENTS

| | | | | |
|---|---|---|---|---|
| 2006/0141255 | A1* | 6/2006 | Muller et al. ................. | 428/403 |
| 2008/0054621 | A1* | 3/2008 | Burchard et al. ............... | 283/72 |
| 2010/0295287 | A1* | 11/2010 | Reichert et al. ................. | 283/70 |

FOREIGN PATENT DOCUMENTS

| | | | |
|---|---|---|---|
| EP | 1 310 381 | | 5/2003 |
| EP | 1 516 956 | | 3/2005 |
| EP | 1 580 297 | | 9/2005 |
| EP | 1467873 | | 4/2007 |
| WO | 00/50249 | | 8/2000 |
| WO | 03/061980 | | 7/2003 |
| WO | 2004/014663 | | 2/2004 |
| WO | WO 2005038136 | A1 * | 4/2005 |
| WO | 2005/075215 | | 8/2005 |
| WO | WO 2006018172 | A1 * | 2/2006 |
| WO | WO 2009053391 | A2 * | 4/2009 |

* cited by examiner

SECURITY ELEMENT WITH COLOR-SWITCHING EFFECT, USE OF SAME AND METHOD FOR PRODUCING SAME

BACKGROUND OF THE INVENTION

The invention relates to a security element having a color-tilt effect and cutouts which are identifiable in transmitted light, a method for the production thereof, and the use thereof.

Security elements that have a color-tilt effect are known. Color-tilt effects can be achieved in various ways, for example, by thin-film interference such as in built-up structures having a layer that reflects electromagnetic waves, a spacer layer, and a layer formed from metallic clusters. Such security elements are described in US 2005/042449 A or in EP 1 558 449 A, for example.

Another way to provide a security element with a color-tilt effect is to use a coating made of liquid crystals, either in the form of a pigmented layer or a polymerized film.

A data storage medium is known from EP 0 435 129 A having a liquid-crystal security element, wherein the material is a liquid-crystal polymer that exists as a solid in oriented form at room temperature.

Disclosed in WO 00/50249 A is a security element that has an optically variable material, which can be for example a liquid-crystal material, and at least one additional machine-readable featural material in the same layer.

To optimally recognize the color-tilt effect, a light-absorbing background, preferably a black background, is needed. However, the light-absorbing, preferably black, background is clearly visible as a dark area on the back of a security element, such as a thread or strip embedded at least partially into a valuable document such as a bank note or the like. Therefore, this light-absorbing background must be covered to keep the security element from being recognizable right away. This covering can be done through a metallic layer, for example.

Known from EP 1 467 873 A is a method for producing a substrate, comprising the following steps: Applying a cover coating onto at least a portion of a metal layer on a first side of a transparent polymer film, removing metal from the areas not covered by the cover layer to form metal-free sections, and applying another layer to cover the cover coating and the metal-free sections. The other layer is a layer of liquid-crystal polymer material, and the cover coating is dark in color and masks the metal areas beneath the cover coating and leads to a color-change effect in the areas covered by the liquid-crystal polymer material when viewed under reflection from the first side, and the contrast between the metalized and the metal-free areas can be clearly differentiated.

Known from EP 0 319 157 A is a valuable document for bank notes comprising a security element that is at least partially embedded and that has a metallic layer with cutouts in the metallic layer, wherein the cutouts constitute 10-50% of the metallic layer.

Known from EP 1 580 297 A is a film material, in particular for security elements, which comprises a full-area or partial opaque coating, the opaque coating being produced from a single material component by way of a PVD or a CVD process and having different color impressions from different sides.

The object of the invention is to provide a security element with a material that has an optically variable effect, preferably a color-tilt effect, and that has cutouts which are identifiable in transmitted light. The security element is designed such that it allows optimum recognition of the optically variable effect while at the same time not being recognizable from the back side through the paper surface in the at least partially embedded state in a valuable document when viewed in reflection.

The subject of the invention is therefore a security element comprising a coating of a material which has an optically variable effect, in particular a color-tilt effect, and cutouts which are identifiable in transmitted light. The security element comprises a carrier substrate and a partial layer having cutouts, in which the partial layer is made of an opaque coating having light-absorbing properties on the side that faces the coating made of the material having an optically variable effect and having a metallic coloration on the side that faces away from the coating made of the material having an optically variable effect. The partial opaque coating consists of a light-absorbing metallic layer and a reflective metallic layer.

When viewed in transmitted light, the cutouts are identifiable as a clear contrast compared to the areas that comprise a light-absorbing and a reflective metallic layer. The security element, when embedded in a valuable document, is not identifiable, or barely so, from the back side even by incident light through the paper surface due to the reflective metallic layer. However, the cutouts are clearly identifiable from the back side in transmitted light. From the front side, the optically variable effect and the cutouts are clearly identifiable by incident light.

Possible carrier substrates include carrier films, preferably transparent, flexible plastic films, such as those made of PI, PP, MOPP, PE, PPS, PEEK, PEK, PEI, PSU, PAEK, LCP, PEN, PBT, PET, PA, PC, COC, POM, ABS, PVC, PTFE, ETFE (ethylene tetrafluoroethylene), PFA (tetrafluoroethylene-perfluoropropylvinylether-fluorine copolymer), MFA (tetrafluoromethylene-perfluoropropylvinylether-fluorine copolymer); PTFE (polytetrafluoroethylene), PVF (polyvinyl fluoride), PVDF (polyvinylidene fluoride), and EFEP (ethylene-tetrafluoroethylene-hexafluoropropylene-fluorine terpolymer). The carrier films are preferred to have a thickness of 5-700 μm, more preferably 5-200 μm, and most preferably 5-50 μm.

The material having an optically variable effect can be a printing dye containing pigments made of liquid-crystal material. In particular, the pigments consist of cholesteric or a mixture of nematic and cholesteric liquid crystals. Also, optically variable interference pigments (OVI pigments) can be used. Such pigments are described in US 2003/0207113, for example. In another embodiment, iridescent pigments can be used, for example Iriodine® pigments. Iriodine® is based on naturally occurring mineral mica flakes that are encased with semitransparent metal oxides. Furthermore, the material having an optically variable effect can consist of a liquid-crystal polymer that is applied as a solution of cholesteric monomers or a mixture of cholesteric and nematic monomers, followed by cross-linking. The cross-linking can be done thermally or by way of treatment with UV radiation or electron radiation.

Preferred light-absorbing metallic layers include non-stoichiometric aluminium oxide and stoichiometric or non-stoichiometric copper oxide. The light-absorbing metallic layer is preferred to have a dark to black color. The stronger the background absorption in the visible spectral range (350-800 nm), the stronger the visible optically variable effect.

Possible reflective metallic layers include metals such as Al, Sn, Cu, Zn, Pt, Au, Ag, Cr, Ti, Mo, Fe, Pd, Ni, Co or alloys thereof, such as Cu/Al.

In one particular embodiment, the light-absorbing metallic layer can consist of non-stoichiometric aluminium oxide, preferably with an oxygen content of about 19-58 at %, and the reflective metallic layer can consist of aluminium.

The cutouts in the light-absorbing metallic layer and the reflective metallic layer are completely identical and can be made in the form of characters, letters, numbers, images, symbols, lines, guilloches and the like. Combinations of these forms are also possible. The cutouts can also be present in negative form. In other words, for example, the area around a character, letter, and the like can constitute the cutout.

The security element according to the invention can also comprise other security features that can exist in further layers. These security features can exhibit specific chemical, physical and even optical or optical active properties, for example.

To adjust the magnetic properties of a layer, paramagnetic, diamagnetic and ferromagnetic materials such as iron, nickel and cobalt or compounds or salts thereof can be used (for example oxides or sulphides).

What are particularly suitable are magnetic pigment dyes with pigments based on iron oxides, iron, nickel, cobalt and alloys thereof, barium or cobalt ferrites, hard and soft magnetic iron and steel types in aqueous or solvent dispersions. Possible solvents include i-propanol, ethyl acetate, methyl ethyl ketone, methoxypropanol and mixtures thereof. It is preferable for the pigments to be placed in acrylate-polymer dispersions with a molecular weight of 150 000 to 300 000, in nitrocellulose, acrylate-urethane dispersions, acrylate-styrene or PVC dispersions, or such dispersions containing solvents.

The magnetic layer can also comprise a coding. In the process, magnetic materials of the same coercivity and/or remanence, as well as different coercivities and/or remanences can be used to form the coding. In another embodiment, the reflective metallic layer itself can have magnetic properties. This is achieved for example by using a magnetic material such as Fe, Ni, or Co.

The optical properties of the layer can be influenced using visual dyes and pigments, luminescent dyes and pigments that fluoresce or phosphoresce in the visible range, UV range or in the IR range, and heat-sensitive dyes and pigments. These can be used individually and in all possible combinations.

Optically active features are understood here to mean diffraction structures, diffraction gratings, kinegrams, holograms, DID® (zero order microstructures in combination with thin films). These optically active features can be produced by known UV stamping methods, for example, such as are described in EP 1 310 381 A, or by way of hot stamping methods.

In order to anchor the security element in or on the valuable document, the element is usually provided with an adhesive layer on one or both sides. This adhesive layer can be produced either in the form of a hot-seal, cold-seal or self-adhesive layer. The adhesive can also be pigmented, wherein all known pigments or dyes, such as $TiO_2$, ZnS, kaolin, ATO, FTO, aluminium, chromium and silicon oxides, or organic pigments such as phthalocyanine blue, i-indolide yellow, dioxazine violet and the like can be used, for example. Furthermore, luminescent dyes and pigments that fluoresce or phosphoresce in the visible range, UV range or in the IR range, and heat-sensitive dyes and pigments can be added. These can be used in all possible combinations. In addition, luminescent pigments can also be used alone or in combination with other dyes and/or pigments.

If necessary, the security element can also be protected by one or more protective varnish layer(s) that can be pigmented or un-pigmented, or can be further refined by way of lamination or the like, for example.

Another subject of the invention is a method for producing a security element comprising a material that causes an optically variable effect, in particular a color-tilt effect, and that has cutouts that are identifiable in transmitted light, the method comprising the following processing steps:

Preparing a carrier substrate,

Applying a color application that is soluble in a solvent onto the carrier substrate in the form of the cutouts, Applying a full-area reflective metallic layer, Applying a full-area light-absorbing metallic layer, Removing the color application together with the layers on top thereon by way of a solvent, if necessary in combination with a mechanical effect, Applying a full-area or partial layer comprising a material having an optically variable effect.

This method achieves absolutely identical cutouts in the light-absorbing and the reflective metallic layer. When viewed in transmitted light, the cutouts are identifiable as a clear contrast compared to the areas that comprise a light-absorbing and a reflective metallic layer. Because of the reflective metallic layer, the security element, when embedded in a valuable document, is not identifiable, or barely so, even when viewed with incident light from the reflective metallic layer side through the covering paper surface.

In a first step, a color application that is soluble in a solvent is applied to the carrier substrate in the form of the later cutouts. In a second step, this layer is treated using an in-line plasma, corona or flame process, if necessary. In a third step, the reflective and then the light-absorbing metallic coating is applied by way of a PVD or CVD process. In a fourth step, the color application with the layers disposed thereon is removed using a solvent, if necessary in combination with a mechanical effect.

The color application is done either in the form of characters, letters, numbers, images, symbols, lines, guilloches or a point or line pattern, or a semitone pattern and the like, or such that the color application forms the outlines of the characters, letters, numbers, images, symbols, lines, guilloches or a point or line pattern, or a semitone pattern and the like. In the first case, the cutouts are identifiable in the final structure in transmitted light in the form of characters, letters, numbers, images, symbols, lines, guilloches and the like. In the second case, the characters, letters, numbers, images, symbols, lines, guilloches and the like are dark in transmitted light, and the areas around these characters, letters, numbers, images, symbols, lines, guilloches and the like form the cutouts that are identifiable in transmitted light.

The color application can be done using any desired method, for example through intaglio printing, flexographic printing, screen printing, digital printing and the like. The dye or colored varnish used is soluble in a solvent, preferably water, but a dye which is soluble in any desired solvent, such as in alcohol, esters and the like, can be used. The dye or colored varnish can be common compositions based on natural or synthetic macromolecules. The soluble dye can be pigmented or un-pigmented. All known pigments can be used as pigments. What are particularly suitable are $TiO_2$, ZnS, kaolin and the like.

Then, if necessary, there is a pretreatment step for the carrier substrate provided with the color application prior to the application of the metallic layers. The pretreatment can involve an in-line plasma (low pressure or atmospheric plasma), corona or flame process. This pretreatment improves the adhesion of the metallic layer. At the same time, the surface is activated. In the process, terminal polar groups are produced on the surface.

If necessary, a thin metal or metal oxide layer can be applied simultaneously with the application of the plasma or corona or flame treatment as an adhesion promoter, for example by way of sputtering or vapour deposition. What are particularly suitable here are Cr, Ti, $TiO_2$, Si oxides or chromium oxides. This adhesion promoter layer generally has a thickness of 0.1 nm-5 nm, preferably 0.2 nm-2 nm, more preferably 0.2 to 1 nm.

Then, the reflective metallic layer is applied by way of PVD or CVD processes, such as thermal evaporation, sputtering or electron beam evaporation.

In a PVD process, the coating is deposited onto the carrier substrate under a vacuum (up to $10^{-12}$ mbar, preferably $10^{-2}$ to $10^{-6}$ mbar) at a temperature that depends on the vapour pressure and the thickness of the coating to be applied, such as through thermal evaporation, arc evaporation or electron beam evaporation.

Another option is to apply the coating by way of AC or DC sputtering, wherein the process is selected depending on the thickness of the layer to be applied and on the material used accordingly.

In a CVD process, the materials to be applied are introduced to a vacuum coating system in the form of gaseous (e.g. organometallic) precursors by way of an inert carrier gas (such as $N_2$, argon). Here, the materials are broken up through the input of energy and caused to react. A portion of the reaction products condenses onto the substrate and forms the desired layer there, whereas the remaining reaction products are removed using a vacuum system. Gaseous precursors can include CO, $CO_2$, oxygen, silanes, methane, ammonia, ferrocene, trimethyl aluminium or the like, for example. The input of energy can be accomplished by way of an ion or electron beam, a plasma or an elevated temperature, for example.

In the following step, a light-absorbing metallic layer is deposited similarly by way of PVD or CVD processes, such as through thermal evaporation, sputtering or electron beam evaporation.

For the application of the light-absorbing metallic layer, the coating is oxidized through a correspondingly metered amount of oxygen feed to form non-stoichiometric oxides. This changes the appearance as well. Non-stoichiometric aluminium oxide or stoichiometric or non-stoichiometric copper, oxide thus appears black and forms a light-absorbing metallic layer this way.

Then, the color layer is removed by way of a suitable solvent, matched to the composition of the color layer. It is preferable for the color application to be water-soluble. If necessary, dissolution can be supported by mechanical effects.

Alternatively, the cutouts can also be produced through a known etching process. In the process, the reflective and light-absorbing metallic layer are first applied to the carrier substrate and then an etching resist is applied which leaves exposed the later cutouts. In another step, the areas of the two layers not covered by the etching resist are removed through etching. If necessary, the etching resist can then be removed.

In another step, a full-area or partial layer of a material having an optically variable effect is applied. The application can be carried out through any desired method, such as intaglio printing, flexographic printing, screen printing, digital printing, co-rotational or counter-rotational roller application methods, curtain coating, spin coating and the like.

In another embodiment, the method for producing the security element can be carried out as follows:

Preparing a first carrier substrate,

Applying a full-area or partial layer of a material having an optically variable effect, Preparing a second carrier substrate, Applying a color application that is soluble in a solvent in the form of cutouts onto the second carrier substrate, Applying a full-area reflective metallic layer Applying a full-area light-absorbing metallic layer, Removing the color application together with the layers on top thereon by way of a solvent, if necessary in combination with a mechanical effect, Laminating the layers on the second carrier substrate against the layers on the first carrier substrate, If necessary, removing the first carrier substrate.

In the process, the layers that comprise the cutouts which are identifiable in transmitted light are constructed on a second carrier substrate, whereas the layer comprising a material having an optically variable effect is applied to the first carrier substrate.

This embodiment is particularly preferred when using liquid-crystal polymers as the layer with an optically variable effect, the polymers being applied in solution in the form of their monomers, whereupon cross-linking is done. The molecule chains can orient themselves onto the carrier substrate in this process. Then, the layers applied to the second carrier substrate are laminated against the layers present in the first carrier substrate, and depending on the intended use of the security element the first carrier substrate can be removed if necessary.

If necessary, further security features having optical, optically active, electrically conductive or magnetic properties can be applied to the first and/or second carrier substrate or onto the layers present thereon, or can already be applied thereon.

The security element so produced can then be provided with one or more protective varnish layer(s) and/or an adhesive layer on one or both sides.

Another subject of the invention is a method for producing a transferable security element comprising a material that causes an optically variable effect, in particular a color-tilt effect, and that has cutouts that are identifiable in transmitted light, the method comprising the following processing steps:

Preparing a first carrier substrate,

Applying a full-area or partial layer comprising a material having an optically variable effect, Applying a color application that is soluble in a solvent in the form of the Cutouts Applying a full-area light-absorbing metallic layer, Applying a full-area reflective metallic layer, Removing the color application together with the layers on top thereon by way of a solvent, if necessary in combination with a mechanical effect, Applying a hot-seal, cold-seal or self-adhesive layer.

In the process, the entirety of the construction of the layer is on the first carrier substrate, wherein all process steps listed occur analogous to the method described above. If necessary, a release layer can be applied to the carrier substrate prior to applying the layer of a material having an optically variable effect, the adhesion of the release layer to the carrier substrate being less than the adhesion to the layers applied thereon. Possible advantageous release layers include UV varnish layers, but other known poorly adhering varnish compositions, such as compositions based on methacrylate or oil layers, polyamide, polyethylene or fluoropolymer wax layers, can be used as well. The application of a release layer is not required if the layer made of a material having an optically variable effect is itself releasable. The security element so produced can be applied to a substrate with the adhesive layer, wherein the first carrier substrate is optionally removed after application.

Figure 1:
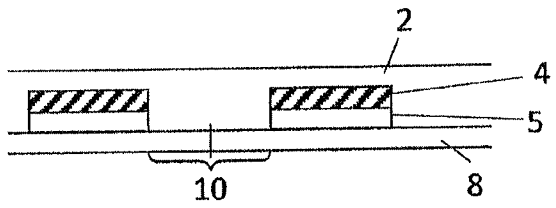
FIGS. 1 to 5 show security elements according to the invention. In these figures.

1 is an adhesive layer (for example a hot-seal varnish layer)
2 is an optically variable layer comprising a material that causes an optically variable effect
3 is a laminated adhesive layer
4 is a light-absorbing metallic layer
5 is a first reflective metallic layer
6 is a protective varnish layer
7 is a partial magnetic layer with magnetic properties
8 is a first carrier substrate
9 is a second carrier substrate
10 are the cutouts in the light-absorbing and reflective metallic layer
11 is a second reflective metallic layer
12 is the document substrate of a valuable document, for example paper.

DETAILED DESCRIPTION OF THE INVENTION

Shown in FIG. 1 is a security element that is suitable for at least partial embedding and application. The layers are constructed on a (first) carrier substrate 8. In the process, a background opaque layer includes a (first) partial reflective metallic layer 5 and a partial light-absorbing metallic layer 4 with the cutouts 10 is applied first, followed by a full-area optically variable layer 2 comprising a material having an optically variable effect.

Figure 1A:
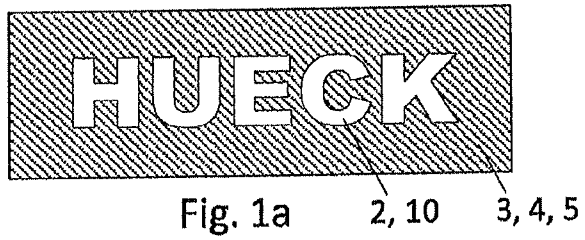

FIG. 1*a* shows the security element illustrated in FIG. 1 as viewed in incident light from the side of optically variable layer 2 with an optically variable effect. The optically variable effect can be a color-tilt effect, for example. A strong color is identifiable in the areas in which layer 2 lies over the background opaque layer including the light-absorbing metallic layer 4 and the reflective metallic layer 5. When the security element is tilted such that the angle of viewing changes, a color envelope is visible, particularly in the areas in which layers 2, 4 and 5 lie one above the other. The areas in which optically variable layer 2 comes to lie over cutouts 10 show no or only weakly identifiable color impression in incident light. In transmitted light, the area in which layers 2, 4 and 5 lie superimposed on one another appears opaque. The cutouts 10 are identifiable in transmitted light as a bright area with a strong contrast to the surrounding dark areas.

Figure 2:
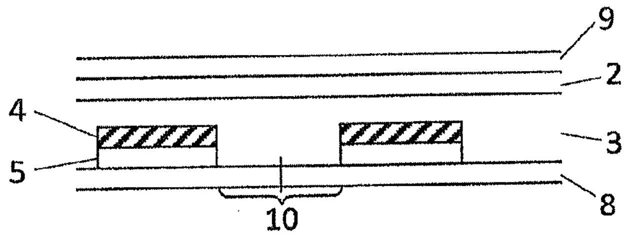

Shown in FIG. 2 is a security element according to the invention in which the layers are constructed on two carrier substrates (8, 9). The optically variable layer 2 with an optically variable effect is applied to the second carrier substrate 9, and the reflective metallic layer 5 and the light-absorbing metallic layer 4 with the cutouts 10 are constructed on the first carrier substrate 8. The two carrier substrates 8, 9 with the layers applied thereon are connected together by a laminated adhesive layer 3 such that the optically variable layer 2 having an optically variable effect comes to lie on the side of the light-absorbing metallic layer 4. If the security element is now observed through the second carrier substrate 19, a color impression is seen which depends on the angle of observation in a manner similar to that described in the case of FIG. 1.

Figure 3:
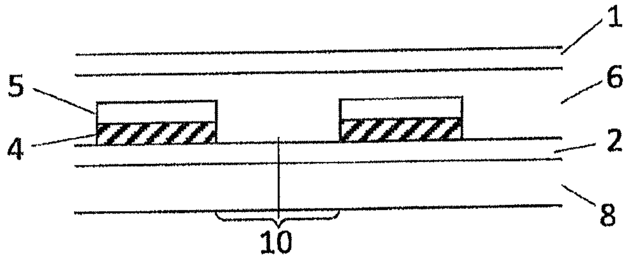
Figure 4:
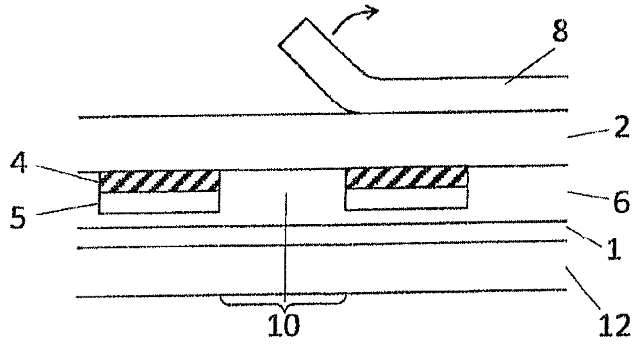

The security element according to the invention as shown in FIGS. 3 and 4 is a transfer element. Such a transfer element is preferably used when the security element is not embedded in a valuable document, but rather is applied to the surface of a valuable document. In the process, the structure (FIG. 3) is constructed on a carrier substrate 8, wherein the first layer to be applied is the optically variable layer 2 comprising a material with an optically variable effect, and then the light-absorbing metallic layer 4 and the reflective metallic layer 5 with the cutouts 10 are applied. The security element is provided with a protective varnish layer 6 and an adhesive layer 1, preferably a hot-seal adhesive layer. The adhesion of layer 2 to layer 8 is weaker than the adhesion of layers 2, 4, 5, 6, 1 and 8 to one another.

Shown in FIG. 4 is the transfer element applied to a document substrate of a valuable document, for example a paper bank note. The transfer element is applied to the valuable document 12 substrate by the hot-seal adhesive layer 1, and then the carrier substrate 8 is pulled off. The structure remaining on the valuable document is then only a few μm thick and does not cause any discernible thickening of the valuable document at this point, thus avoiding thickness-related problems in stacking.

Figure 5:
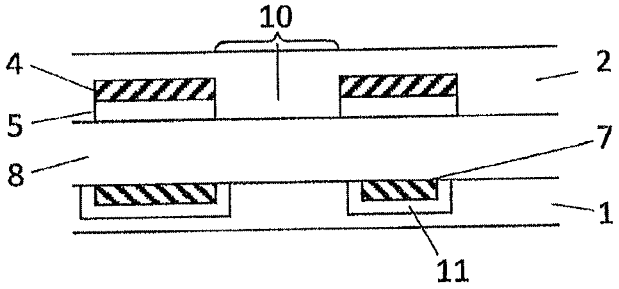

Shown in FIG. 5 is a security element according to the invention, the structure of which corresponds essentially to the structure shown in FIG. 1, but which additionally comprises a partial magnetic layer 7. Furthermore, an additional partial reflective metallic layer 11 is provided to cover the dark magnetic areas of partial magnetic layer 7. In an application as a security thread which is at least partially embedded in the valuable document, the security element is normally still provided with an adhesive layer on both sides, the adhesive layer ensuring a secure anchoring of the thread in the valuable document.

The security elements according to the invention are suitable as security features in data storage media, in particular valuable documents such as IDs, cards, bank notes or labels, seals and the like, if necessary after corresponding tailoring, but also as packing material, for example in the pharmaceutical, electronic and/or food industries, such as in the form of blister films, folded boxes, covers, film packaging and the like.

For the application as security features, the substrates and film materials are preferably cut into strips, threads or patches, wherein the width of the strips or threads can preferably be 0.5-20 mm and the patches are preferred to have average widths and lengths of 0.3-20 mm.

For the application in or on packages, the film material is preferred to be cut into strips, bands, threads or patches, wherein the width of the threads, strips or bands is preferred to be 0.5-50 mm and the patches are preferred to have average widths and lengths of 12-30 mm.

The invention claimed is:

1. A security element comprising:
a carrier substrate;
an optically variable effect layer comprising a liquid-crystal polymer material and having a color-tilt effect;
a background opaque layer formed between said optically variable effect layer and said carrier substrate,
said background opaque layer including:
a light-absorbing metallic layer on a first side of said background opaque layer facing said optically variable effect layer; and
a reflective metallic layer on a second side of said background opaque layer facing away from said optically variable effect layer;

wherein said background opaque layer has cutouts for allowing light to be transmitted therethrough, and said reflective metallic layer preventing said optically variable effect layer from being identified when the security element is viewed from the side of the reflective metallic layer.

2. The security element of claim 1, wherein said liquid-crystal polymer material is formed from cholesteric liquid crystals or a mix of cholesteric and nematic liquid crystals.

3. The security element of claim 1, wherein said optically variable effect layer is a printing ink having optically variable pigments, said pigments being one of cholesteric liquid-crystal pigments, a mixture of nematic and cholesteric liquid-crystal pigments, optically variable interference pigments, or iridescent pigments.

4. The security element of claim 1, wherein said light-absorbing metallic layer consists of one of non-stoichiometric aluminium oxide, stoichiometric copper oxide, or non-stoichiometric copper oxide.

5. The security element of claim 1, wherein said reflective metallic layer consists of Al, Sn, Cu, Zn, Pt, Au, Ag, Cr, Ti, Mo, Fe, Pd, Ni, Co or alloys thereof.

6. The security element of claim 1, wherein said cutouts for allowing visible light to be transmitted therethrough are shaped as positive or negative signs, letters, numerals, images, symbols, lines, guilloches, a point or line raster, or a halftone raster.

7. The security element of claim 1, further comprising at least one additional layer having optical, optically active, electrically conductive, or magnetic properties.

8. The security element of claim 7, wherein said at least one additional layer has magnetic properties in the form of a coded magnetic layer.

9. The security element of claim 7, wherein said at least one additional layer has magnetic properties in the form of a magnetic layer consisting of magnetic materials.

10. The security element of claim 9, wherein said magnetic materials have the same coercivity and/or remanence.

11. The security element of claim 9, wherein said magnetic materials have different coercivity and/or remanence.

12. The security element of claim 1, further comprising at least one protective varnish layer on at least one side of said security element.

13. The security element of claim 12, wherein said at least one protective varnish layer is pigmented.

14. The security element of claim 12, wherein said at least one protective varnish layer is unpigmented.

15. The security element of claim 1, further comprising a heat-seal, cold-seal, or self-adhesive coating on at least one side of said security element.

16. The security element of claim 15, wherein said heat-seal, cold-seal, or self-adhesive coating is pigmented.

17. The security element of claim 15, wherein said heat-seal, cold-seal, or self-adhesive coating is unpigmented.

18. The security element of claim 1, wherein said carrier substrate is a first carrier substrate at a first side of said security element, further comprising a second carrier substrate at a second side of said security element opposite said first side.

19. A protected object comprising:

an object substrate; and said security element of claim 1 applied to said object substrate, wherein said object substrate is one of a document substrate, a data carrier substrate, and a packaging substrate.

* * * * *